Figure 1:
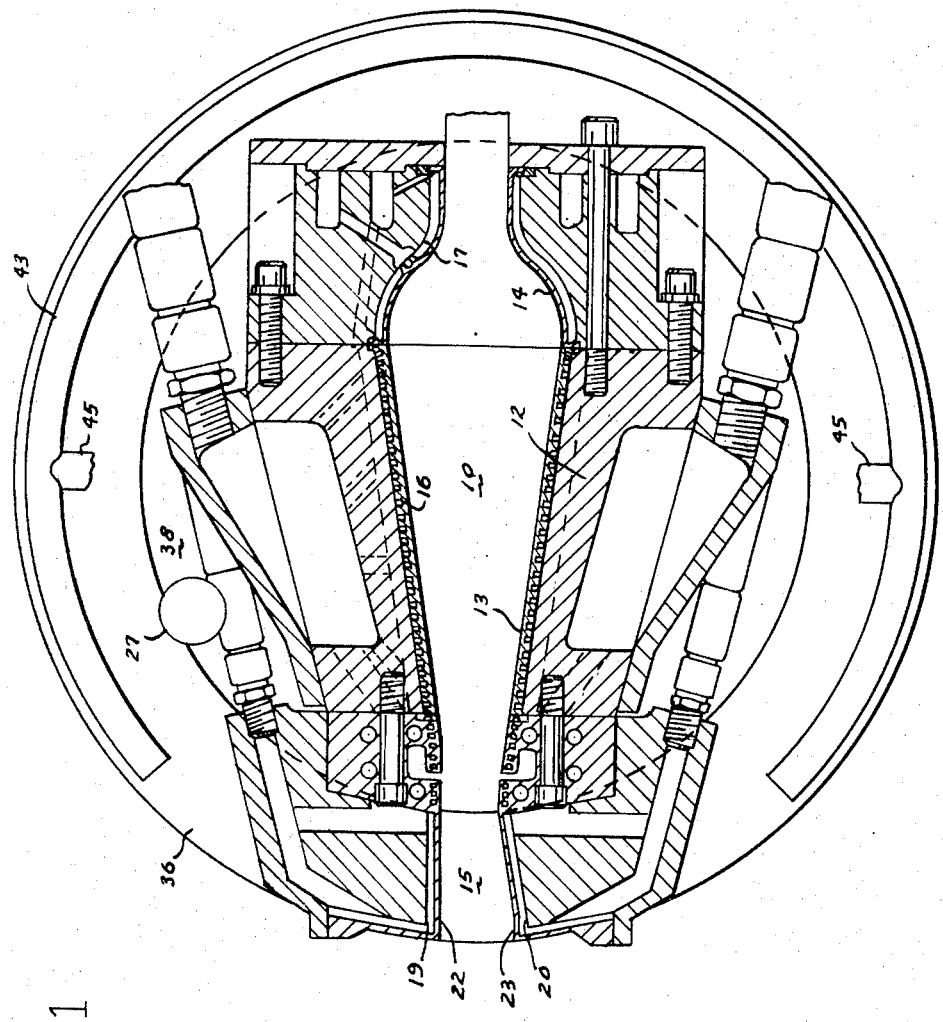

March 25, 1969         J. E. CARPENTER ET AL         3,434,663
                ROTATING LIP HOT GAS COLLECTOR NOZZLE
Filed Sept. 28, 1965                                Sheet 1 of 2

INVENTORS
JAMES E. CARPENTER
RICHARD L. PLEUTHNER
Harry A. Herbert Jr
ATTORNEY
BY
Richard J. Killoran
AGENT

3,434,663
ROTATING LIP HOT GAS COLLECTOR NOZZLE
James E. Carpenter, Williamsville, and Richard L. Pleuthner, East Aurora, N.Y., assignors to the United States of America as represented by the Secretary of the Air Force
Filed Sept. 28, 1965, Ser. No. 491,859
Int. Cl. F02k *1/24, 11/02*
U.S. Cl. 239—132.3     2 Claims

This invention relates to a nozzle for collecting a high temperature, high pressure gas stream.

One object of the invention is to provide a nozzle for collecting a high temperature, high pressure gas stream which is capable of withstanding higher temperatures than prior art devices.

Another object of the invention is to provide an apparatus for continuously moving the leading edges of a nozzle immersed in the heated air flow in and out of the heated air stream.

Figure 2:
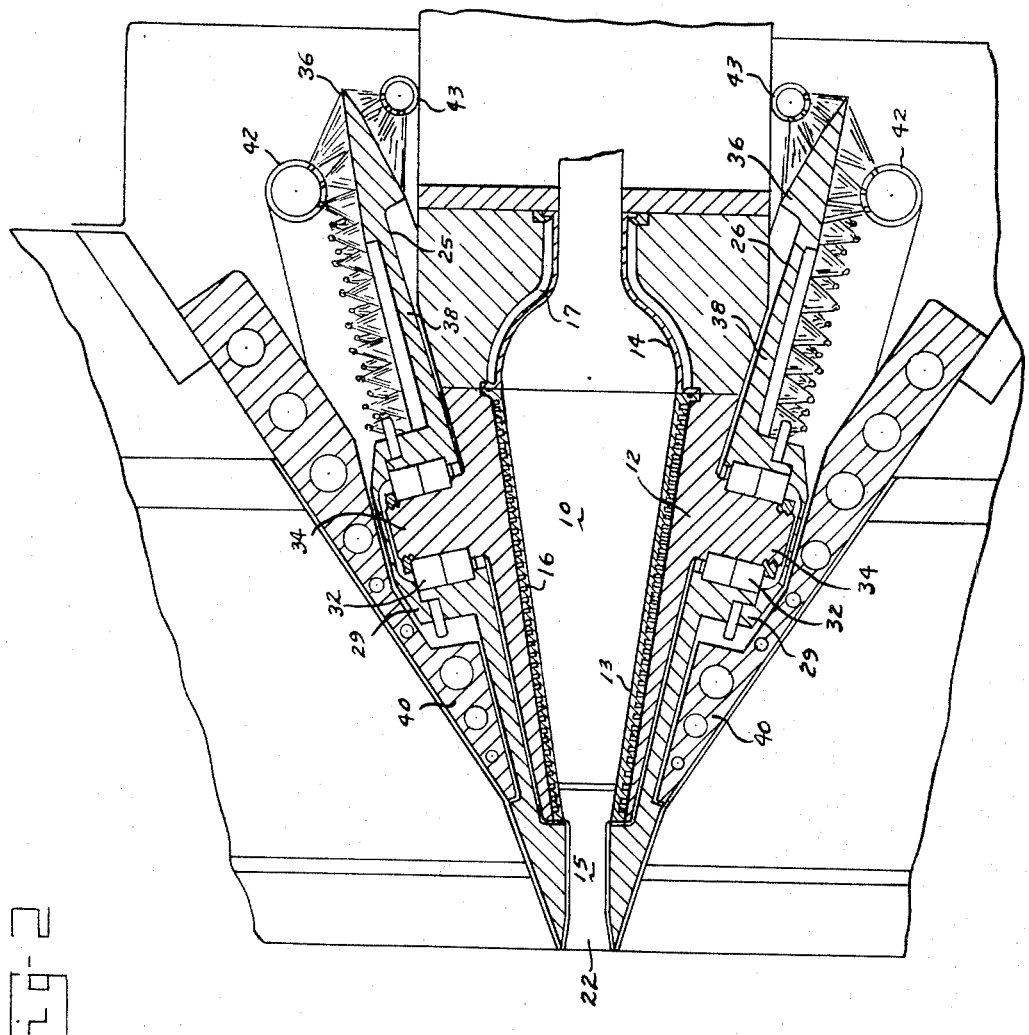

These and other objects will be more fully understood from the following detailed description taken with the drawing, wherein:

FIG. 1 is a sectional view of a collector nozzle showing a plan view of one of the nozzle wheels; and FIG. 2 is a full sectional view of the collector nozzle of FIG. 1 showing a cross-section of the nozzle wheels.

The nozzle of this invention is for collecting high temperature, high pressure gas such as generated by a Wave Superheater. The Wave Superheater is a machine consisting of a multiplicity of shock tubes mounted side-by-side on the periphery of a rotating drum or rotor. By means of fixed nozzles at the ends of the rotor, these tubes are alternately charged with pure air and then shock-processed by a low molecular weight gas. This process compresses the air and heats it to high temperatures. Each tube discharges the processed air in a cyclic manner at a fixed station at the end of the rotor. By virtue of the multiplicity of tubes and high rotational speed, the air flow emanating from the Wave Superheater has the characteristics of steady flow and can be collected in a nozzle and expanded in a supersonic or hypersonic wind tunnel.

The collector nozzle used with this device must collect the high temperature, high pressure air as it leaves the Wave Superheater. The nozzle entrance geometry is in the form of a rectangle of height slightly greater than that of a rotor shock tube. The width depends on the air stream characteristics but, in general, may be equal to one to three tube widths. Hence, the top and bottom leading edges or lips are somewhat displaced out of the air flow whereas the two side leading edges are completely immersed as only the central portion of the air flow is collected.

A Wave Superheater can generate a supersonic air flow having a total air temperature and pressure in the order of 9,000 degrees R and 200 atmospheres, respectively, for periods of 15 to 30 seconds. The leading edges of the collector side walls, which for aerodynamic reasons must have a very small lip radius (say 0.05 inch), are thus subject to aerodynamic heating rates as high as 16,000 B.t.u./ft.$^2$-sec. There is no known material which can survive such severe heating even when the lips are internally cooled. It is mainly in the vicinity of the leading edges that such high heating rates are manifested. As the air expands in the supersonic nozzle, the heating rates drop such that internal wall cooling is feasible at a relatively short distance from the leading edges.

According to this invention, the leading section of the two side walls of a conventional collector are replaced with rotating discs. As a portion of the disc enters the hot air stream, it receives heat for a fraction of a second, and then moves out of the stream. Upon emergence both inner and outer surfaces are subjected to fine high pressure water sprays to extract heat by convection and evaporation. The disc diameter is relatively large compared to the nozzle height so that the heating time is a small fraction of the time available for cooling.

Reference is now made to FIG. 1 of the drawing which shows a modified conventional divergent-convergent nozzle 10 having a divergent member 12 with a wall 13 having a substantially conical shaped inner surface, a convergent member 14 of conventional shape and a leading section 15. The divergent member 12 and convergent member 14 are cooled in the conventional manner by means of a coolant passed through cooling tubes 16 and cooling channel 17. Coolant is also supplied to the channels 19 and 20 adjacent the top and bottom walls 22 and 23 of the nozzle leading section 15. The coolant, which may be liquid or gas, is supplied to the tubes 16 and channels 17, 19 and 20 in the conventional manner. The side walls of the leading section of the nozzle are replaced by rotating wheels 25 and 26, made of copper or other good heat-sink material. Wheels 25 and 26 are driven by any well-known means such as a motor shown schematically at 27 and friction drive (not shown).

Since the wheels 25 and 26 are substantially identical, like reference characters will be used for both wheels. These wheels consist of central hubs 29 supported for rotation by bearings 32 on shafts 34 formed on the outer surface of divergent member 12. The wheels have annular wedge-shaped nozzle rim members 36 supported on the central hubs 29 by means of disc-shaped support members 38. The wedge-shaped members provide substantially parallel side walls for the leading section 15. The support member 38 passes between the divergent nozzle member 12 and a cooled wall member 40. The annular wedge-shaped nozzle members 36 are cooled by means of high pressure water sprays from perforated supply tubes 42 and 43. The water or other coolant is supplied to the tubes 42 and 43 in the conventional manner such as input tubes 45 shown connected to tube 43 in FIG. 1.

In the operation of the nozzle, the top 22 and bottom 23 are located outside of the high temperature, high pressure gas stream (not shown), so that their heating rate is relatively low and proper cooling can be obtained by coolant flow through channels 19 and 20. The side walls of the nozzle are provided by means of rotating wheels 25 and 26. The wedge-shaped members 36 of wheels 25 and 26 have a portion thereof located adjacent the sides of nozzle leading section 15, and form the sides of the nozzle. The wheels 25 and 26 are continuously rotated to continuously present different portions of the wedge members 36 to the hot gases. As each portion of a wedge member 36 is moved out of the hot gas stream it is cooled by a high pressure water spray so that the heat is removed from the member 36.

There is thus provided a nozzle for collecting high temperature, high pressure gases.

While a certain specific embodiment has been described, it is obvious that numerous changes may be made without departing from the general principle and scope of the invention.

We claim:

1. In a gas collector nozzle having a divergent wall member, means for cooling the said divergent wall member, a convergent wall member adjacent said divergent wall member, means for cooling said convergent wall member; an apparatus for providing a leading wall section for said nozzle comprising a pair of spaced fixed wall members attached to said divergent wall member; means for providing a pair of movable wall members having a portion thereof perpendicular and adjacent to said fixed wall members; means for continuously changing the portions of said movable wall members adjacent to said fixed wall members and means for continuously cooling the portion of said movable wall members nonadjacent to said fixed wall members.

2. In a gas collector nozzle for collecting high-temperature, high-pressure gases, having a divergent wall member, means for cooling the said divergent wall member, a convergent wall member adjacent said divergent wall member, means for cooling said convergent wall member; an apparatus for providing a leading wall section for said nozzle comprising two spaced fixed wall members attached to said divergent wall member; a pair of disc members; means for rotatably supporting said disc members on said divergent wall member; each of said disc members having a wedge-shaped rim member secured thereto with a portion of each of said rim members being located adjacent said fixed wall members to thereby provide a pair of movable walls adjacent to said leading wall section; means for continuously moving said wedge rim members past said fixed wall members and means for continuously cooling the portion of said rim members nonadjacent to said fixed wall members.

No references cited.

SAMUEL FEINBERG, *Primary Examiner.*

U.S. Cl. X.R.

60—39.66; 165—86; 230—208; 239—60.1